United States Patent [19]

Iima et al.

[11] Patent Number: 5,043,569
[45] Date of Patent: Aug. 27, 1991

[54] OPTICAL SYSTEM OF LASER BEAM READER

[75] Inventors: Mitsunori Iima; Seiich Mori; Mikio Horie; Masatoshi Takano, all of Tokyo, Japan

[73] Assignee: Asahi Kogaku Kogyo Kabushiki Kaisha, Tokyo, Japan

[21] Appl. No.: 470,737

[22] Filed: Jan. 26, 1990

Related U.S. Application Data

[63] Continuation-in-part of Ser. No. 349,679, May 10, 1989, abandoned, which is a continuation-in-part of Ser. No. 266,662, Nov. 3, 1988, Pat. No. 4,968,876.

[30] Foreign Application Priority Data

| Nov. 4, 1987 | [JP] | Japan | 62-278943 |
| Jan. 27, 1989 | [JP] | Japan | 1-18131 |
| May 25, 1989 | [JP] | Japan | 1-131740 |
| Jul. 12, 1989 | [JP] | Japan | 1-181344 |

[51] Int. Cl.$^5$ .................................................. H01J 3/14
[52] U.S. Cl. ........................................ 250/216; 250/566
[58] Field of Search ..................... 250/216, 568, 566; 235/472, 473, 462; 382/59; 350/437, 235, 236, 237

[56] References Cited

U.S. PATENT DOCUMENTS

| 3,961,198 | 6/1976 | Aungst | 250/216 |
| 4,365,323 | 12/1982 | Heemskerk | 250/201.5 |
| 4,488,042 | 12/1984 | Clay et al. | 250/566 |
| 4,539,482 | 9/1985 | Nose | 250/208.1 |
| 4,678,288 | 7/1987 | Lonsdale et al. | 250/566 |
| 4,682,016 | 7/1987 | Inoue | 250/555 |
| 4,806,774 | 2/1989 | Lin et al. | 250/550 |
| 4,818,847 | 4/1989 | Hara et al. | 250/566 |
| 4,825,057 | 4/1989 | Swartz et al. | 235/472 |

*Primary Examiner*—David C. Nelms
*Attorney, Agent, or Firm*—Sandler, Greenblum & Bernstein

[57] ABSTRACT

An optical system of a laser reader has a light projecting portion for emitting a laser beam of light converging toward an object, a condenser lens for condensing a reflecting light from the object and a light receiving element for detecting light quantity of the reflecting light condensed by the condenser lens. The optical axis of the light projecting portion and that of the condenser lens are substantially parallel within a readable range which is established by a relation between a spatial frequency of the object and a spot diameter of the laser beam of light. The laser emits infrared radiation and a light emitting diode emits a visible guide light to confirm the position of the infrared laser spot.

22 Claims, 9 Drawing Sheets

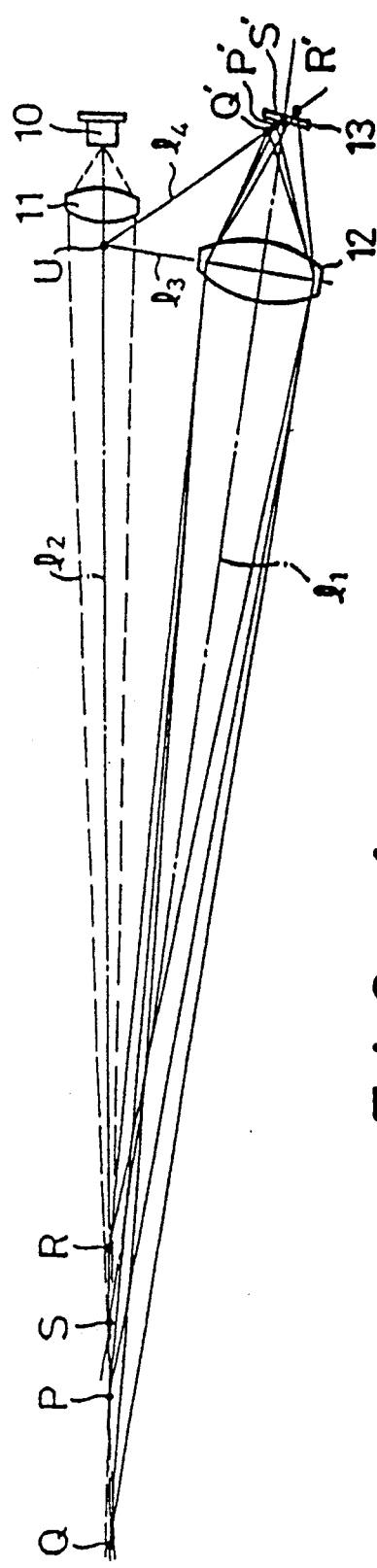
F I G. 3
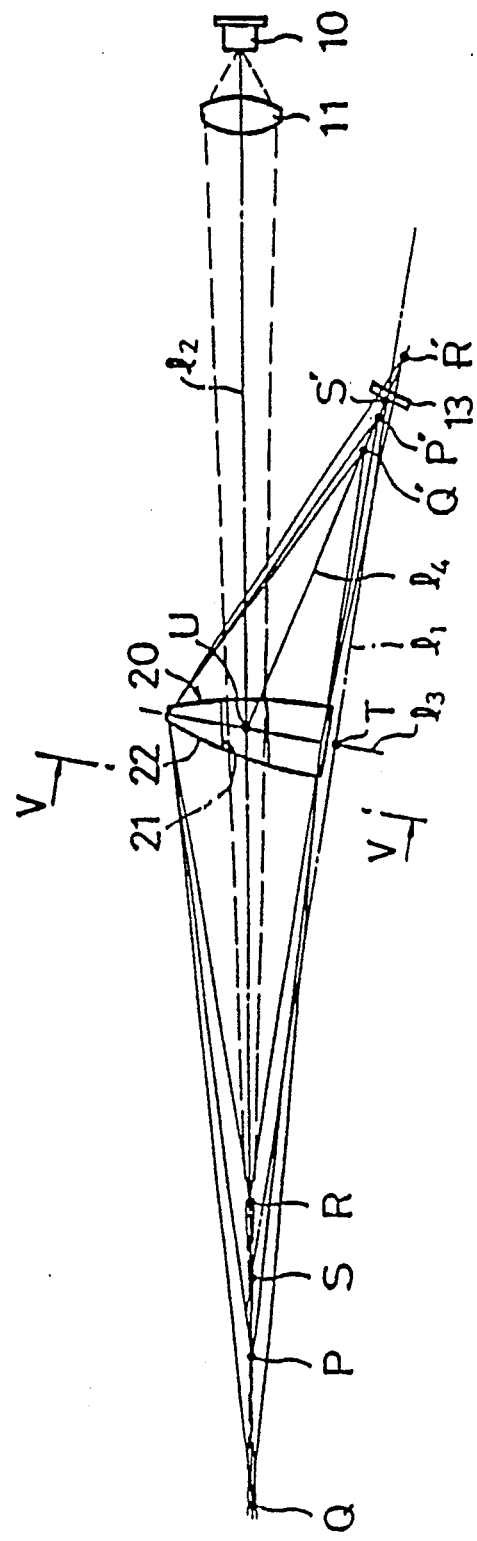
F I G. 4

OPTICAL SYSTEM OF LASER BEAM READER

BACKGROUND OF THE INVENTION

1. Continuing Data

This application is a continuation-in-part of U.S. Pat. application Ser. No. 07/349,679, filed May 10, 1989, now abandoned, which is a continuation-in-part of U.S. Pat. application Ser. No. 07/266,662, filed on Nov. 3, 1988, now U.S. Pat. No. 4,968,876 both of which are hereby expressly incorporated by reference in their entireties.

2. Field of the Invention

This invention relates to an improvement in an optical system of a laser beam reader for irradiating a laser beam to an object and for receiving a beam of light reflected by the object to detect differences in reflectance.

3. Discussion of Background and Relevant Information

A reader of this type, e.g., a pen type bar code reader, is known.

The components of an optical system of a conventional pen type bar code reader are schematically shown in FIG. 6. In the figure, reference numeral 1a denotes a casing of a bar code reader. Within casing 1a, a light emitting diode (LED) 2 acting as a light source, and a light receiving element 3, are disposed. Light emitted by the LED 2 illuminates a bar code pattern (not shown), i.e., an object to be read, through a converging element 4, and is then reflected by the bar code pattern and made incident into the casing 1a again through converging element 4. A part of the reflected light, which has been made incident into the casing 1a, is guided to the light receiving element 3 through an optical fiber 5.

When the bar code pattern is read, the bar code pattern is contacted by the converging element 4; and, in that state, the bar code pattern is scanned by the reader. In this way, it is possible to detect bar code pattern information in accordance with changes in reflectance of the bar code pattern due to the scanning.

However, the above-mentioned bar code reader has an extremely narrow readable range. Therefore, when the converging element 4 and the bar code pattern are separated from each other, it becomes impossible to read the bar code pattern. Therefore, in case a printed surface of the bar code pattern is not smooth, e.g., when the pattern is printed on a flexible bag or the like, the converging element 4 and the bar code pattern are readily separated during scanning due to the unevenness of the printed surface. As a result, it becomes impossible to read such a bar code pattern.

The present invention has been developed to solve the above-mentioned problems. It is therefore an object of the present invention to provide an optical system for a laser beam reader which is capable of detecting information of an object being read even if the object is separated from the reader during the reading.

SUMMARY OF THE INVENTION

In order to achieve the above object, the readable range of the bar code reader must be widened. To this end, it is required that an angular aperture of projecting beams of light be made small and obstacles, such as optical fibers, must be removed from the optical path, so that convergence of the projecting beams of light will not deteriorate and so that the reflecting light effectively converges to a light receiving element.

Therefore, an optical system of a laser beam reader, according to a preferred embodiment of the present invention, comprises a light projecting portion for emitting a converging laser beam of light towards an object, a condenser lens for condensing reflected light from the object, and a light receiving element for detecting the quantity of light of the reflecting light condensed by the condenser lens wherein an optical axis of the light projecting portion and that of the condenser lens are substantially parallel with each other.

BRIEF DESCRIPTION OF THE DRAWINGS

Thus, referring to the drawings which are attached hereto:

FIG. 3 is a schematic diagram showing a modified embodiment of FIG. 2;

FIG. 4 is a schematic diagram showing another embodiment of the present invention;

DETAILED DESCRIPTION OF THE EMBODIMENTS

The embodiments of the present invention will be described with reference to FIGS. 1 through 11.

First Embodiment

Figure 2:
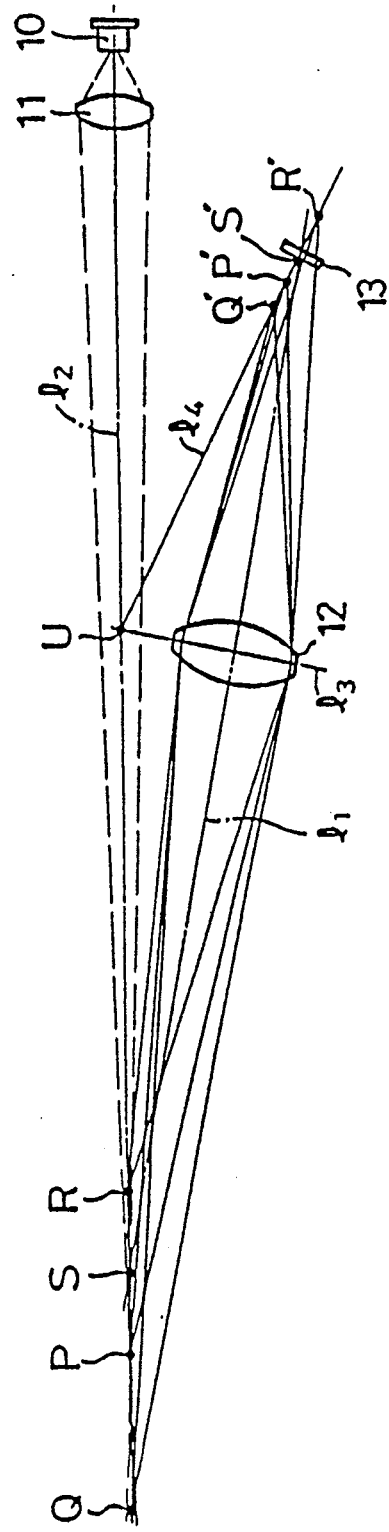
FIG. 2 is a schematic diagram showing another embodiment of the present invention.

FIG. 2 shows a first embodiment of the present invention and FIG. 3 shows a modified embodiment thereof.

The common elements of these two embodiments will be described first herein. In these optical systems, a light projecting portion for projecting a converging laser beam of light leftwardly in the figure towards an object (not shown) comprises a laser diode 10 (hereinafter referred to as "LD") and a projecting lens 11. The light projecting portion is set such that a readable beam diameter is provided with respect to the spatial frequency of information on an object in the section Q~R at the front and behind the beam waist P.

A beam of light reflected by the object is condensed toward a light receiving element 13 through a condenser lens 12. At this time, points P, Q and R at the object side are imaged at Q', P' and R', respectively, through the condenser lens 12.

It is noted that although the middle point of Q and R is the beam waist P at the reading side, the distance between Q' and P' becomes shorter than that between P' and R' on the image side. Therefore, in order to simultaneously read the information of the object at both ends Q and R of the readable range, the light receiving element 13 is located at the middle point S' of the image point range Q'~R' corresponding to the readable range.

The condenser lens 12 is located such that an optical axis $l_1$ thereof intersects an optical axis $l_2$ of the light projecting portion at a point S (point conjugate with the image point 3') within the readable range Q~R.

A linear line passing through the center of condenser lens 12 and intersecting with optical axis $l_1$ at right angles is represented by $l_3$, and a point where linear line $l_3$ intersects with optical axis $l_2$ of the light projecting portion is represented by U. A point on the optical axis $l_2$ at the object side is imaged on a line $l_4$ which connects points U and S' according to the Scheimpflug rule.

Due to the above-mentioned arrangement, the condensing efficiency can be most increased when the object is present at point S. However, the point of intersection of optical axes $l_1$ and $l_2$ is not limited to point S, as already mentioned. The condensing efficiency is improved as long as the point of intersection is present within the reading depth Q~R.

If an optical system of a laser beam reader is formed in the manner shown in FIG. 2, the convergency of the projecting beam of light is excellent because no obstacle is present in the optical path of the projecting beam of light, as occurs in conventional readers. Furthermore, since the light receiving element can be located comparatively close to the object, the light quantity which can be condensed is comparatively large.

However, if the condenser lens 12 is proximate to the object, the viewing from the condenser lens 12 into the section Q~R on the optical axis 1 becomes large. Therefore, the irregularity of the image points Q' and R' also become large. As a result, the detecting range which should be covered by the light receiving element 13 becomes large too. However, the light receiving element, which is generally used, for example, in pen type bar code readers, is an element such as a photo-transistor, a photo-diode, or the like. It is impossible for these elements to completely cover a large light receiving range such as previously mentioned.

It is noted that the readable range ideal for reading a spatial pitch of the object is established by the constitution of the projecting portion. However, the actual reading ability of information of the object within a readable range is established by the ratio between an information signal output by the light receiving element 13 and noise.

Therefore, even if the light receiving element 13 is not able to receive all reflected light coming from the readable range, as previously mentioned, information from an object can be read by properly establishing the output power of LD 10, the sensitivity of light receiving element 13, etc.

FIG. 3 shows an example in which condenser lens 12 is comparatively spaced apart from the object and the viewing angle from the condenser lens 12 into the section of the point Q~R on the optical axis 1 is made small. With this construction, since the range of irregularity of the image points Q' and R' can be made small by reducing the power of condenser lens 12, the same detecting range of light receiving element 13, as shown in FIG. 2, can be completely covered.

However, since the energy of reflecting light is reduced in inverse proportion to the square of a distance, in the event that the distance between the object and the condenser lens is as large as in the present case, the light quantity to be condensed is less than that of the example of FIG. 2, as long as a condenser lens 12 of the same diameter is used. In this case, reading ability can also be maintained by making the emitting light quantity of LD 10 large or by making condenser lens 12 large in diameter.

Second Embodiment

Figure 1:
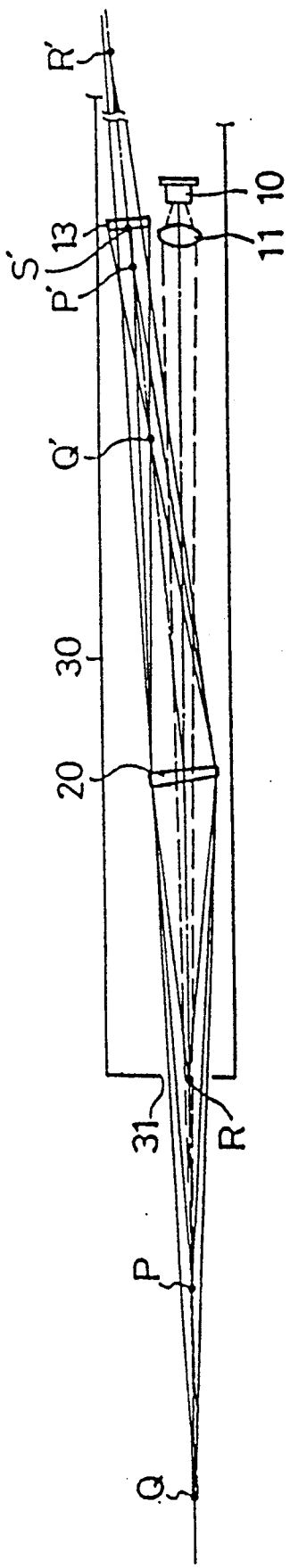
FIG. 1 is a schematic diagram showing an optical system of a laser beam reader according to an embodiment of the present invention.
Figure 5:
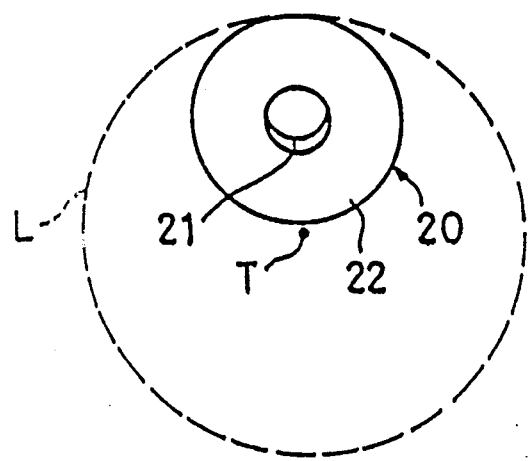
FIG. 5 is a plan view of a light receiving lens of the optical system of FIG. 4 when viewed from the direction of line V—V.
Figure 6:
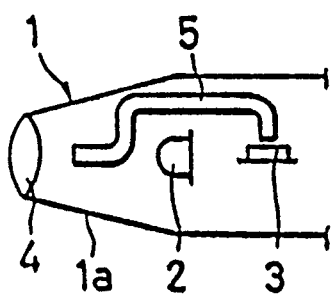
FIG. 6 is a schematic diagram showing an optical system of a conventional pen type bar code reader.

FIGS. 1, 4 and 5 show a second embodiment of the present invention.

The principle of an optical system according to this embodiment will be described first with reference to FIG. 4. In the figure, a light projecting portion comprises an LD 10 and a projecting lens 11. The light projecting portion is set such that a readable beam diameter with respect to a spatial frequency of information which the object has is maintained in the section Q~R at the front and behind the beam waist P.

A condenser lens 20 for guiding reflecting light to a light receiving element 13 is located in an optical path of the light projecting portion.

Condenser lens 20 comprises a lens L (spherical lens in this example) of rotary symmetry, with its outer diameter shown by the broken lines in FIG. 5; lens L is thus cut such that it has a central axis in a position displaced from its optical axis. Condenser lens 20 is located at predetermined angles so that an optical axis $l_1$ of an imaginary lens L and an optical axis $l_2$ of a light projecting portion will intersect with each other at a point S (the point conjugate with the image point S').

The condenser lens 20 is provided at its central portion with a light transmitting portion 21 for allowing a beam of light emitted by the light projecting portion to progress without changing direction. The periphery of light transmitting portion 21 is a deflecting lens portion 22 for deflecting/condensing reflecting light. In this example, light transmitting portion 21 is an opening.

In FIG. 4, the center of an imaginary lens L is represented by T; a linear line passing through center T and vertical to an optical axis $l_1$ of imaginary lens L is represented by $l_3$; and the point of intersection of linear line $l_3$ and optical axis $l_2$ of the light projecting portion is represented by U.

Although light transmitting portion 21 is merely an opening in this example, a plane vertical to the optical axis $l_2$ of the light projecting portion may be formed on each surface of condenser lens 20. Alternatively, a plane having a different power from the periphery may be formed so that a projecting beam of light will converge. Likewise, the imaginary lens L, as a matrix of condenser lens 20, is not limited to a spherical lens having both convex surfaces as shown in this example. Instead, it may be an aspherical lens or a Fresnel lens.

Light receiving element 13 is disposed at an image point S' conjugate with the point S through condenser lens 20, with its light receiving surface held vertical to a linear line $l_4$.

The function of such an optical system, as mentioned above, will now be described.

A laser beam emitted by LD 10 becomes a convergent pencil of rays through projecting lens 11. The pencil of rays converges so that it becomes the smallest in beam diameter at point P after passing through light transmitting portion 21 of condenser lens 20. The projecting beam of light is reflected by an object placed between the points Q~R. The reflected light advances along the same optical path as the projecting beam of light until it reaches condenser lens 20, and is then caused to be moved outwardly from the optical path of the projected light at predetermined angles with respect to optical axis $l_2$ of the light projecting portion, by deflecting lens portion 22, and is then condensed towards light receiving element 13.

If the object is present at point P at this time, the reflected light converges to an image point P' on light receiving element 13 which is conjugate with point P.

If a linear line passing through points U and P' is represented by $l_4$, a conjugate point of a point on the optical axis $l_2$ at the object side through condenser lens 20 is present on linear line $l_4$. Therefore, in the event that the object is present at point Q, the reflected light converges towards the image point Q', whereas when the object is present at point R, the reflected light converges toward image point R'.

In this way, according to the Scheimpflug rule, the center lines of the respective reflecting beams of light which converge to different image points can be moved into alignment with linear line $l_4$. And, since linear line $l_4$ passes through the center of condenser lens 20, the converging direction is the same even if the position of the image point is different on optical axis $l_2$, and even when condenser lens 20 approaches an object, the area of reflected light can be covered with a small light receiving element. Therefore, the reflected light can be more effectively guided to the light receiving element than in the aforementioned embodiment.

Furthermore, since condenser lens 20 can be located within the optical path of the projected light, the construction of this portion can be made compact compared with the above-mentioned optical system in which the condenser lens is disposed along a path separately from the optical path of projected light.

Another example in which the present invention is applied to a pen type bar code reader will now be described with reference to FIG. 1. Identical component parts to those of FIG. 4 are denoted by identical reference numerals and description thereof will thus be omitted.

A casing 30 of this bar code reader contains a light projecting portion comprising an LD 10, a projecting lens 11, and a condenser lens 20 of the same type as that of FIGS. 4 and 5, and a light receiving element 13. A laser beam, which is emitted by LD 10, converges toward position P of the beam waist by projecting lens 11, and a readable beam diameter with respect to a bar code pattern of a certain specification is maintained in the section Q~R at the front and behind the beam waist P.

The casing 30 is provided at its front end portion with an opening 31 for permitting a beam of light to pass therethrough, the opening 31 being coincident with a point R. The opening 31 may be a through-hole, as shown in the figure, or it may be covered with cover glass.

The function of this optical system is the same as that of FIG. 4 described above. Regarding the bar code pattern of a certain specification, information can be read even when the pattern is separated apart from the opening of casing 30 as long as it is located somewhere between points Q~R.

In addition, the readable range becomes wider than the points Q~R when a bar code pattern of a specification of smaller spatial frequency (rough pattern) than the above-mentioned specification is read, whereas the readable range becomes narrower than the points Q~R when a bar code pattern of a specification of larger spatial frequency is read. And, when the readable range becomes narrow, a bar code pattern closely contacted with the opening 31 becomes impossible to read. Therefore, when bar code patterns of several kinds of specifications are to be read, the limit point at the near side of the reading depth with respect to a bar code of a specification of the largest spatial frequency is brought into coincidence with the opening 31 and, for example, the point R of FIG. 1 is positioned within the casing 30.

Although an optical system of a laser reader of the present invention is applied to a pen type bar code reader in this embodiment, it can detect optical information of a material without contact, so that it can be used for inspecting a surface of a substance, such as dust attached to a product, or the like.

Third Embodiment

A third embodiment of the present invention will now be described with reference to FIGS. 7-11.

Figure 7:
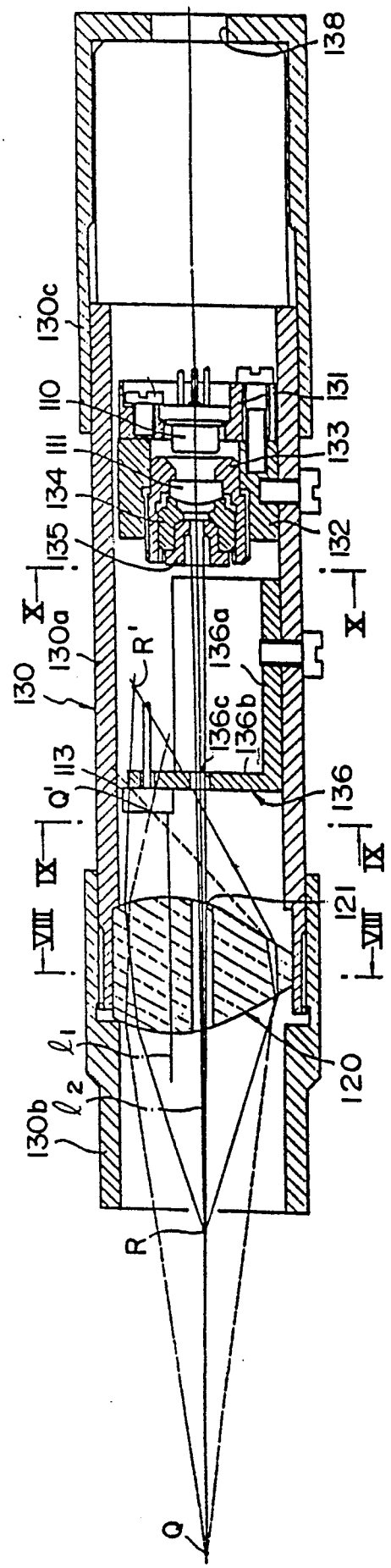
FIG. 7 is a sectional view showing a further embodiment of an optical system of a laser beam reader according to the present invention.

A light projecting portion for projecting a convergent laser beam of light toward an object (not shown) at the left-hand side of FIG. 7 comprises a laser diode 110 and a light projecting lens 111. This light projecting portion is set such that a readable beam diameter is maintained in a section defined by points Q~R covering an area ahead of a beam waist and through an area behind thereof with respect to a spatial frequency of information of the object.

The beam of light reflected by the object converges towards a light receiving element 113 through a condenser lens 120. At this time, the reflection light reflected from points Q,R at the object side converges to positions Q',R', respectively, through condenser lens 120.

In order to read the reflected light from objects placed at both ends Q,R of a readable range at an equal level, the light receiving element 113 is located in such a manner as to be coincident with a point Q' which is conjugate to a distant limit Q within this readable range.

The light quantity level of the reflection is in inverse proportion to the square of a distance to the object from the light receiving element. Therefore, by placing light receiving element 113 in such a position where a reflected light quantity from the most distant portion Q within the readable range most effectively converges and a reflection light from a near part R is dispersed, the light quantity reaching light receiving element 113 can be optically equalized over the entire readable range.

Figure 8:
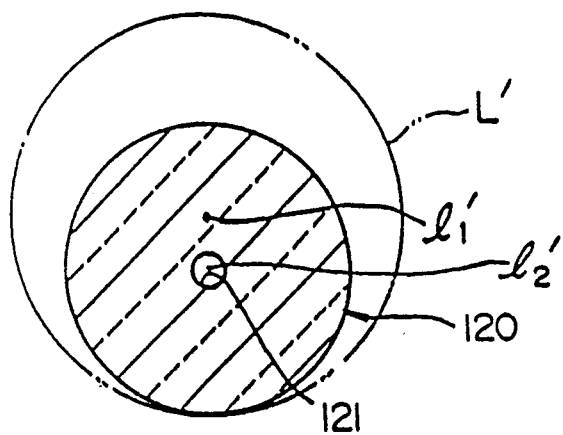
FIG. 8 is a sectional view taken on line VIII—VIII of FIG. 7.

The condenser lens 120 is a rotation asymmetrical lens formed by cutting a rotation symmetrical lens L, the outer diameter of which is shown by a two dot chain line in FIG. 8, such that it has a center axis displaced from its optical axis $l'_1$, which is spaced and in parallel with an optical axis $l'_2$ of the light projecting portion.

An imaginary lens L' as a matrix of the condenser lens 120 is an aspheric lens having a radius of curvature which becomes gradually larger as it goes toward the circumference of the center thereof.

The shorter the focal distance of the condenser lens 120 is, the more the distance between the condenser lens 120 and the light receiving element 113 is reduced. And, therefore, a bar code reader can be made more compact using this arrangement. However, when a spherical lens is used as a condenser lens, in order to obtain a sufficient thickness of the circumferential portion thereof, the radius of the lens becomes smaller as the radius of curvature becomes smaller. Therefore, the condenser lens 120 employed in this embodiment is an aspheric lens having a radius of curvature which becomes gradually larger as it goes toward the circumferential portion thereof. The focal distance is short and a sufficient thickness of the circumferential portion can be obtained.

By using a lens having such an aspherical configuration, since a ray of light which is more remote from the optical axis exhibits the smaller refraction, the spherical aberration can be made smaller as an accompanying effect and the light condensing ability of light receiving element 113 can be improved.

The condenser lens 120 is provided at its central portion with a transmitting portion 121 adapted to permit a beam of light coming from the light projecting portion to be transmitted therethrough without changing its direction.

With the above-described construction, a laser beam emitted by laser diode 110 converges into a beam of light through projecting lens 111 and converges after it has been transmitted through the transmitting portion 121 of condenser lens 120.

The projected beam of light is reflected by an object placed between the points Q~R. The reflected light proceeds along the same optical path of the projected beam of light until it reaches condenser lens 120, and then it is brought out of the optical path of the light projecting portion by condenser lens 120 and condensed toward light receiving element 113.

In a bar code pattern of a predetermined standard, positioned between the points Q-R, information can be read even when it is away from an opening of casing 130.

An arrangement has been proposed in parent U.S. Pat. application Ser. No. 07/266,662, in which an optical axis of a condenser lens 120 intersects an optical axis of a light projecting portion at an object side so that reflected light reflected on the object can effectively be condensed over the entire region within a readable range according to the Scheimpflug rule.

With this arrangement, however, since the output level of the light receiving element is varied according to the distance to the object, the tolerance of the input power of an electric system must be very wide.

If the light quantity level of the reflected light is equalized because of the arrangement of the light receiving element 113 as shown in this embodiment, the reading output power can be equalized and the tolerance of the input power of the electric system can be narrow to reduce the load.

Also, the condenser lens is not required to be tilted according to the Scheimpflug rule and the condenser lens can therefore be mounted with ease.

Figure 9:
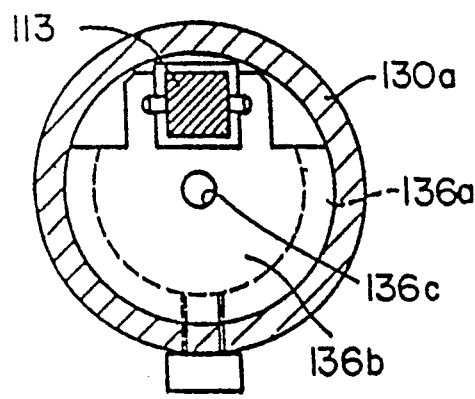
FIG. 9 is a sectional view taken on line IX—IX of FIG. 7.
Figure 10:
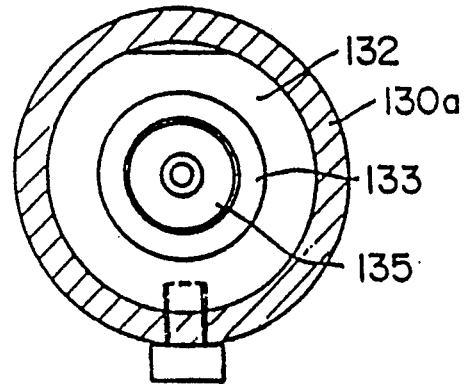
FIG. 10 is a sectional view taken on line X—X of FIG. 7.
Figure 11:
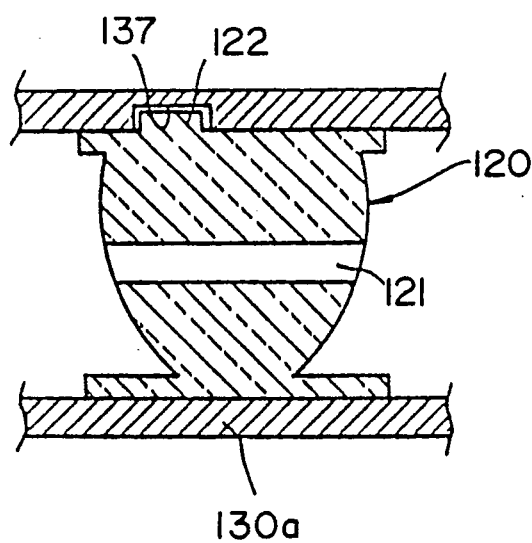
FIG. 11 is a sectional view showing the engagement between a condenser lens and a casing.

The construction of the casing 130 in which the optical elements are disposed will now be described with reference to FIG. 7, FIG. 9 and FIG. 10.

The casing 130 comprises a cylindrical central portion 130a, a cylindrical end portion 130b to be threadedly engaged with a front end side of central portion 130a and a cylindrical rear end portion 130c having a bottom which is to be threadedly engaged with a rear end side of central portion 130a.

Laser diode 110 abuts against a cylindrical holding frame 131 from the left-hand side of FIG. 7 and is secured thereto by a fastening screw 131b. The holding frame 131 is secured to a cylindrical base 132 of the light projecting portion which is bolted tightly to central portion 130a of the casing.

The projecting lens 111 is stored within a lens frame 133 to be threadedly engaged with base 132 of the light projecting portion and is secured to lens frame 133 by a lens presser 134 to be threadedly engaged therewith from the left-hand side of the figure. Furthermore, in lens presser 134, there is inserted a diaphragm cap 135 adapted to limit the diameter of the projected beam of light.

The light receiving element 113 is attached to an element holding member 136 which is bolted tightly to the central portion 130a of the casing. Element holding member 136 integrally comprises a semicylindrical portion 136a secured to the central portion 130a of the casing by a screw along the inner wall of the casing, and a front wall 136b attached to the light receiving element 113. The front wall 136b is formed with an optical path hole 136c adapted to permit a laser beam of light from the laser diode 110 to be transmitted therethrough.

The condenser lens 120 is mounted on an end portion at the left-hand side of FIG. 7 of the central portion 130a of the casing. Since the condenser lens 120 is rotation asymmetric and since there is directionality in the mounting, a projection 122 as an engaging portion (see FIG. 11) is formed on a part of the circumferential portion of the condenser lens 120 and a hole 137 for engaging the projection 122 is formed on the inner wall of the casing so that the positioning can be effected with ease when mounting. In the event the condenser lens 120 is a plastic lens, the projection 122 can be molded integrally with the lens.

A bottom wall at the rearmost portion (that is, the right-hand side of FIG. 7) of the rear end portion 130c of the casing is formed with a code hole 138 for guiding an electric power source (not shown) adapted to feed a driving electric current for the laser diode 110 and a signal wire (not shown) adapted to transmit the output power of the light receiving element 113 to the outside.

Fourth Embodiment

A fourth embodiment of the present invention will now be described with reference to FIG. 12.

In above described embodiments, to confirm the point that the laser spot is scanning, a visible radiation type semiconductor laser must be used, because the optical systems of the above described embodiments only use a semiconductor laser as a light source.

However, visible radiation type semiconductor lasers are not able to be continuously used since they are unreliable because thermal runaway is apt to occur due to the large heating value.

Figure 12:
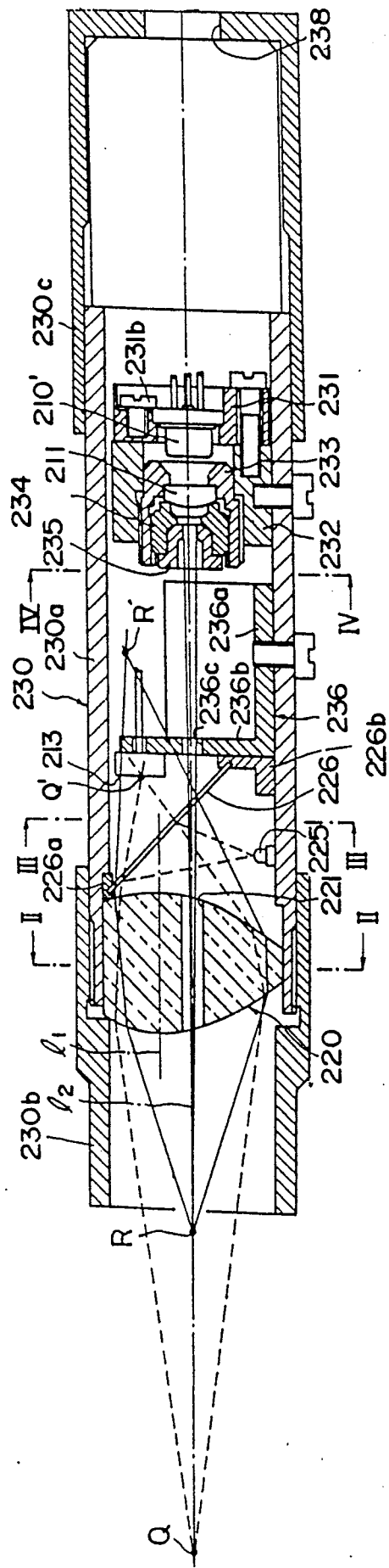
FIG. 12 is a sectional view showing a fourth embodiment of an optical system of a laser beam reader according to the present invention.

In the fourth embodiment of FIG. 12, an infrared radiation type semiconductor laser is used as a light source. Additionally, a guide light projecting portion is mounted for confirming the position where the laser spot is scanning.

As the fourth embodiment has common portions with the third embodiment, only the differences will be described.

A semiconductor laser 210' emits infrared radiation (wave length 780 nm). A laser beam emitted by LD 210' becomes a convergent pencil of rays by passing through projection lens 211. The projected beam of light is reflected by an object and is condensed towards light receiving element 213 through condenser lens 220.

Between the condenser lens 220 and the light receiving element 213 are light emitting diode 225 (wavelength of emitting light : 660 nm), as a guide light projecting portion and dichroic mirror 226 as a light composing element. Dichroic mirror 226 reflects the visible radiation and permits infrared radiation to be transferred. Mirror 226 is held by frames 226a, 226b and is fixed between element holding member 236 and condenser lens 220.

The casing 230 comprises a central portion 230a, an end portion 230b to be engaged with a front end side of central portion 230a and a rear end portion 230c having a bottom which is to be engaged with a rear end side of central portion 230a.

Laser diode 210' abuts against a holding frame 231 from the left-hand side of FIG. 12 and is secured thereto by a fastening screw 231b. The holding frame 231 is secured to base 232 of the light projecting portion which is bolted tightly to central portion 230a of the casing.

The projecting lens 211 is stored within a lens frame 233 to be engaged with base 232 of the light projecting portion and is secured to lens frame 233 by a lens presser 234 to be engaged therewith from the left side of the figure. Furthermore, in lens presser 234, there is inserted a diaphragm cap 235 adapted to limit the diameter of the projected beam of light.

The light receiving element 213 is attached to an element holding member 236 which is bolted tightly to the central portion 230a of the casing. Element holding member 236 integrally comprises a portion 236a secured to the central portion 230a of the casing by a screw along the inner wall of the casing, and a front wall 236b attached to the light receiving element 213. The front wall 236b is formed with an optical path hole 236c adapted to permit a laser beam of light from the laser diode 210' to be transmitted therethrough. Hole 238 serves the same purpose as hole 138 in FIG. 7, that is, to provide for the electric power source.

The guide light projecting LED 225 is located at a position on the other side of dichroic mirror 26 from light receiving element 213.

In this configuration, a laser beam emitted from LD 210' passes through dichroic mirror 226 and the transfer portion 221 of condenser lens 220, and converges towards the object, but the spot formed by LD 210' is not visible by the naked-eye.

On the other hand, the guide light emitted from LED 225 is reflected by dichroic mirror 226, and is formed on the object as a guide spot through condenser lens 220. This spot is visible by the naked-eye and is located near the spot formed by LD 210' (they are coincident with each other at point Q). The user is thereby able to confirm the position of the laser spot indirectly in accordance with the position of the guide spot.

In this embodiment, dichroic mirror 226 as the light composing element is only an example. A half mirror may be used in place of dichroic mirror 226. But with use of the dichroic mirror, energy efficiency is raised due to a reduction of loss of light from LD 210' and LED 225. As the guide light from LED 225 does not reach the light receiving element 213, the guide light does not add noise to the reading signal.

Furthermore, a cubic prism may be used as the light composing element. Depending upon the transmittance of the light composing element, the semiconductor laser is set such that a laser beam is incident on a composing surface (mirror surface, for example) as an P-polarized beam.

Fifth Embodiment

Figure 13:
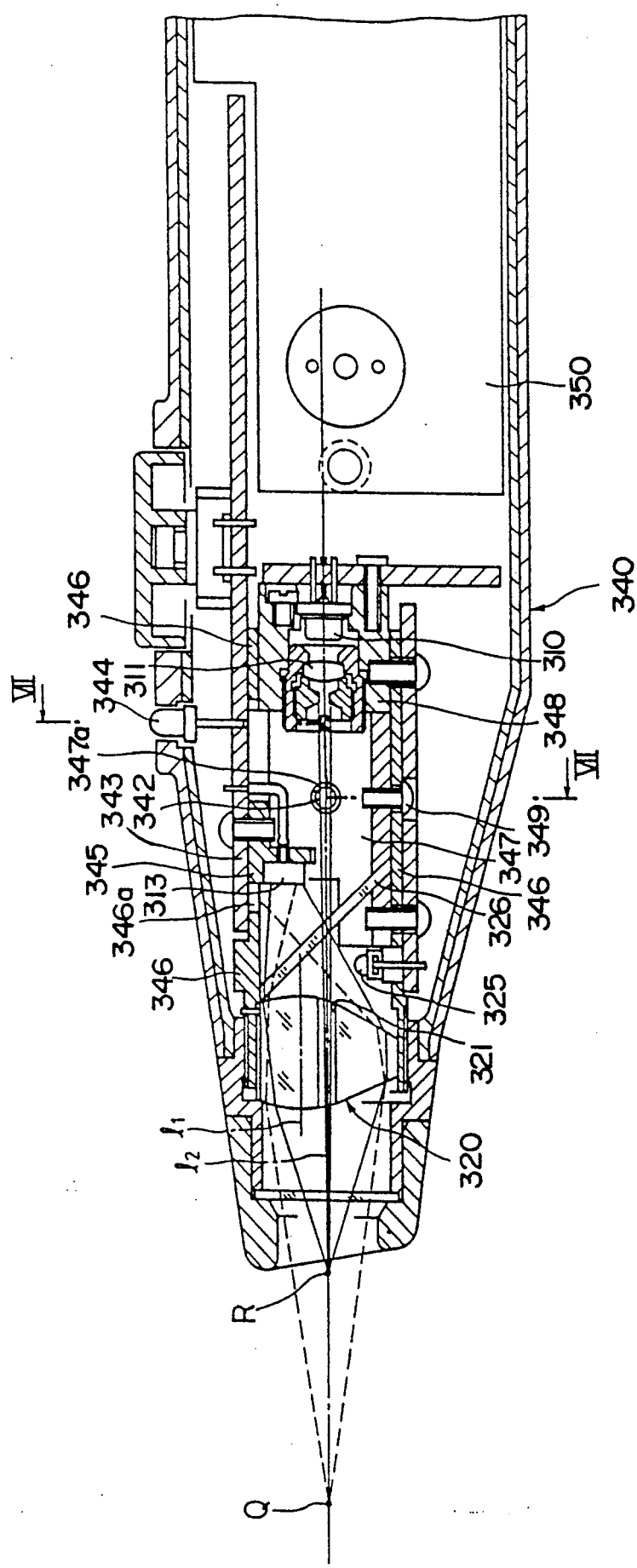
FIG. 13 is a sectional view showing a fifth embodiment of an optical system of a laser beam reader according to the present invention.
Figure 14:
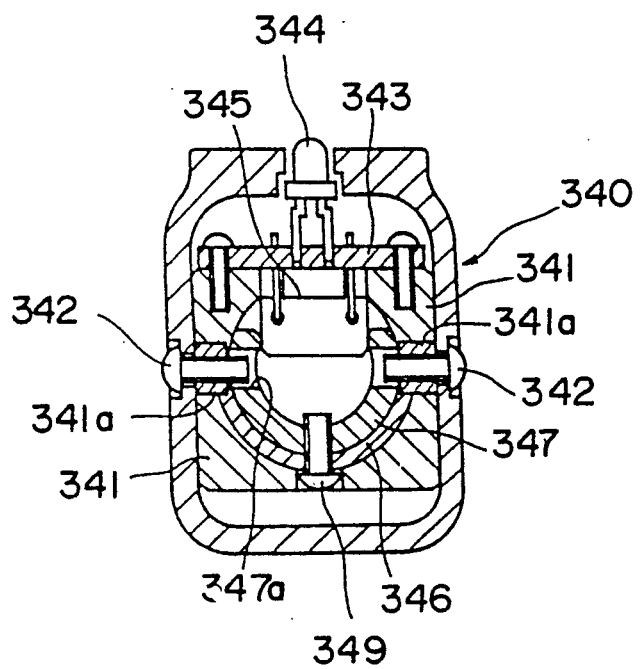
FIG. 14 is a sectional view taken on line XIV—XIV of FIG. 13.

FIGS. 13 and 14 disclose a fifth embodiment of the present invention.

In the construction of the fourth embodiment, optical elements which include LD 210', light receiving element 213, and condenser lens 220 are separately fixed on casing 230. Therefore, if a defective adjustment is detected after assembly, adjustment is complicated because the elements are removed from casing 230.

The laser reader of the fifth embodiment comprises a unit which includes LD 310, light projecting lens 311, light receiving element 313, condenser lens 320 having transfer portion 321, guide light LED 325, and dichroic mirror 326 integrally connected with one another. This unit is then attached to casing 340.

Casing 340 has a rectangular section and a unit base 341 which is inserted and engaged in casing 340 in the transverse direction. As shown in FIG. 14, an outer surface of unit base 341 includes a rectangular section with an inner surface thereof having a circular section. Collar 341a is set in the side wall of unit base 341, and unit base 341 is fixed on the casing 340 by bolt 342 which passes through collar 341a and casing 340.

Substrate 343 is fixed to the upper surface of unit base 341 by bolts, for example, and display LED 344 and element holding member 345 for holding light receiving element 313 are mounted on substrate 343. Cylindrical lens holder 346 for holding the condenser lens 320 is mounted in an inner space of the unit base 341. Half-cylindrical mirror holding member 347 for holding dichroic mirror 326 is located in lens holder 346 as shown in FIG. 14, and light projecting base 348 is located to the right of holding member 347 as seen in FIG. 13. Cutout 346a permits element holding members 345 to be projected into lens holder 346 and is formed at an upper end of lens holder 346. Hole 347a is bored in a side wall of mirror holder 347, and mirror holder 347 is fixed on unit base 341 by bolt 349.

Reference numeral 350 denotes a circuit substrate on which a decoder and a buzzer are mounted.

In accordance with the above construction, each optical element can be fixed on unit base 341, and any adjustment can be carried out before assembly to casing 340. Thus, adjustment and maintenance are simplified.

Although the invention has been described with reference to particular means, materials and embodiments, it is to be understood that the invention is not limited to the particulars disclosed and extends to all equivalents within the scope of the claims.

What is claimed is:

1. An optical system for a laser beam reader comprising:
 a laser projecting portion having an optical axis for projecting a converging infrared radiation beam along an optical path towards an object;
 a condenser lens located in said optical path of the projected beam of infrared projected by said laser projecting portion and having a transmitting portion for permitting the projected beam of infrared radiation to pass therethrough without changing the direction of the projected beam of infrared radiation from said laser projecting portion to said optical axis, and a condensing portion for condensing a beam of light reflected from the object;

a light receiving element for detecting the light quantity of condensed light reflected from the object;

a guide light projecting portion for projecting a visible guide light; and a light composing element for composing the beam of infrared radiation and the visible guide light.

2. The optical system for a laser beam reader according to claim 1, wherein said light composing element is located between the laser projecting portion and the condenser lens.

3. The optical system for a laser beam reader according to claim 1, wherein said light composing element is a dichroic mirror which permits the infrared radiation to pass therethrough and reflects the visible guide light.

4. The optical system for a laser beam reader according to claim 1, comprising an integral unit, said integral unit including said laser projecting portion, said light receiving element, said condenser lens, said guide light projecting portion, and said light composing element.

5. The optical system for a laser beam reader according to claim 3, wherein said dichroic mirror is mounted at an acute angle to said optical path.

6. The optical system for a laser beam reader according to claim 1, wherein said light composing element is located between said light receiving element and said guide light projecting portion.

7. The optical system for a laser beam reader according to claim 6, wherein said light composing element is mounted at an acute angle to said optical path.

8. The optical system for a laser beam reader according to claim 7, comprising a casing for holding said light composing element, said light receiving element, and said guide light projecting portion.

9. The optical system for a laser beam reader according to claim 8, further comprising a holding member extending upwardly from said casing, said light receiving element being mounted on said holding member.

10. The optical system for a laser beam reader according to claim 8, comprising a unit base within said casing, said laser projecting portion, said condenser lens, said light receiving element, said guide light projecting portion, and said light composing element being mounted on said unit base.

11. The optical system for a laser beam reader according to claim 10, wherein said unit base is releasably connected to said casing by at least one bolt.

12. The optical system for a laser beam reader according to claim 10, comprising a substrate connected to said unit base, a holding member extending from said substrate, said light receiving member being mounted on said holding member.

13. The optical system for a laser beam reader according to claim 12, said guide light projecting portion being mounted on said unit base at a position substantially perpendicular to said holding member.

14. The optical system for a laser beam reader according to claim 12, further comprising a display element on said substrate.

15. An optional system for a laser beam reader comprising:

first means for projecting a light along a first axis toward an object and converging said light at a spot on the object;

means for detecting at least a portion of said light reflected by said object;

second means for projecting visible light along a second axis toward the object for confirming the location of said spot on the object; and a light composing element for directing light from said first means and said second means, so that said first axis and said second axis coincide with each other.

16. The optical system for a laser beam reader according to claim 15, wherein said means for projecting light is an infrared laser projecting device.

17. The optical system for laser beam reader according to claim 15, including a condenser lens having a transmitting portion for permitting light from said first means to pass therethrough without changing direction and a condensing portion for condensing the light reflected from the object.

18. The optical system for a laser beam reader according to claim 17, said light composing element being located between said first means and said condenser lens.

19. The optical system for a laser beam reader according to claim 18, wherein said light composing element is a dichroic mirror which permits light from said first means to pass therethrough and reflects light from said second means.

20. The optical system for a laser beam reader according to claim 19, wherein said dichroic mirror is mounted at an acute angle to the path of projected light from said first means.

21. An optical system for a laser beam reader according to claim 15, comprising:

a condenser lens for condensing a beam of light reflected from the object; and an integral unit including at least said first means and said condenser lens.

22. The optical system for a laser beam reader according to claim 21, said integral unit further including said means for detecting.

* * * * *

UNITED STATES PATENT AND TRADEMARK OFFICE
CERTIFICATE OF CORRECTION

PATENT NO. : 5,043,569
DATED : August 27, 1991
INVENTOR(S) : M. IIMA et al.

It is certified that error appears in the above-indentified patent and that said Letters Patent is hereby corrected as shown below:

At column 3, line 18, change "3'" to ---S'---.
At column 3, line 44, change "1" to ---$1_2$---.
At column 10, line 68 (claim 1, line 7), insert ---radiation--- after "infrared".

Signed and Sealed this

Nineteenth Day of April, 1994

BRUCE LEHMAN

*Attest:*

*Attesting Officer*  *Commissioner of Patents and Trademarks*